United States Patent [19]

Gehring

[11] 3,810,047

[45] May 7, 1974

[54] INDUCTORLESS AMPLITUDE MODULATOR AND DEMODULATOR APPARATUS

[76] Inventor: Donald H. Gehring, 401 N. Armistead, Alexandria, Va. 22312

[22] Filed: Dec. 8, 1972

[21] Appl. No.: 313,432

[52] U.S. Cl................ 332/31 R, 307/262, 328/138, 329/50, 332/43 B, 332/44, 332/31 T

[51] Int. Cl.............................................. H03c 1/52

[58] Field of Search........ 332/31 T, 43 B, 43 R, 44, 332/31 R; 329/50; 328/138; 307/262

[56] References Cited

UNITED STATES PATENTS

| | | | |
|---|---|---|---|
| 3,514,720 | 5/1970 | Roucache et al. | 332/43 B |
| 3,229,230 | 1/1966 | Feldman | 332/43 B X |
| 3,205,457 | 9/1965 | Bell | 332/43 B X |
| 3,311,751 | 3/1967 | Maestre | 307/262 X |

*Primary Examiner*—Alfred L. Brody

*Attorney, Agent, or Firm*—Lawrence E. Laubscher

[57] ABSTRACT

An inductorless modulator-demodulator circuit is disclosed including a pair of symmetrical channels each containing a control device biased to Class AB operation. Components of a first input signal are applied to corresponding selected electrodes of the control devices, respectively, the biasing being such that each of the control devices has a constant specific percent of conduction time. Components of a second input signal are applied simultaneously to a pair of electrodes of each control device, respectively, and owing to the specific bias maintained on the control devices, inphase and out-of-phase components of the output signals of the devices may be added in such a manner that undesired out-of-phase components are eliminated through mutual cancellation without filtering, and the in-phase components are added to produce an undistorted output signal. The control devices of the channels of the balanced circuit may be either of the same or opposite polarity, respectively.

15 Claims, 21 Drawing Figures

INDUCTORLESS AMPLITUDE MODULATOR AND DEMODULATOR APPARATUS

Various types of modulator circuits are well known in the patented prior art, as evidenced by the U.S. patents to Krawinkel No. 2,093,729, Freeborn No. 2,862,171, Zawels No. 2,890,418, Reeling No. 3,202,939, Echarti No. 3,239,780 and Massaro No. 3,242,443. In these known circuits, it is common to utilize inductor or transformer components which produce distortion to the extent that the modulation envelope fails to reproduce exactly the modulating signal. More particularly, distortion in an amplitude-modulated wave can arise either from imperfections in the modulating system that produce the wave, or from the action of circuits that transmit the wave. Thus when an amplitude modulated wave is applied to a tuned circuit that resonates at the carrier frequency, the upper and lower sideband frequencies are reduced in amplitude symmetrically by an amount that increases the higher the modulation frequency. At the same time, the sideband frequencies undergo symmetrical phase shifts that introduce undesirable time delay. Furthermore, if the carrier frequency does not coincide with the resonate frequency of the tuned circuit, then the upper and lower sidebands undergo unequal transmission and suffer unsymmetrical phase shifts with respect to the carrier, thereby introducing severe amplitude distortion of the modulation envelope. The present invention was developed to avoid the above and other drawbacks of the known devices by providing an improved modulator-demodulator circuit that is completely free of any inductor, transformer or tuned circuit means, thereby to assure a distortion-free output signal.

Accordingly, a primary object of the present invention is to provide an inductorless amplitude modulator or demodulator circuit the channels of which include a pair of control devices biased to Class AB operation. A first signal, such as a carrier signal (that may be an unmodulated signal or a signal that has been previously amplitude modulated, velocity modulated or amplitude/velocity modulated) is divided into two components having a given phase relationship (either in-phase in a first embodiment, and out-of-phase in a second embodiment) that are applied to corresponding single electrodes of each control device, respectively. The amplitude of said first signal is so selected that each of the control devices has a constant specific percent of conduction time for each cycle of the first signal. A second signal, such as a modulating signal, is divided into two components having a second phase relationship (out-of-phase in a first embodiment and in-phase in a second embodiment, respectively), which components are applied simultaneously to corresponding pairs of electrodes of each control device, respectively. Consequently, there is produced for each control device a resultant output signal of such a magnitude and waveform configuration as to maintain constant said specific percent of conduction time regardless of the instantaneous magnitude of the second signal. Summation means are connected with output terminals of said control devices at locations at which the resultant output components of one input signal are in phase and the resultant output components of the other input signal are out of phase, respectively, thereby to produce an undistorted output signal from which said out-of-phase components have been eliminated through mutual cancellation without filtering.

According to a more specific embodiment of the invention, the circuit comprises an amplitude modulation circuit in which a carrier signal source (which might be velocity modulated with further information impressed on the carrier) is divided into first components that are applied to corresponding electrodes (such as the base electrodes) of the control devices of the channels, respectively, while a modulating signal is divided into second components that are applied to corresponding pairs of electrodes (such as the collector and base electrodes) of said control devices, respectively. Summation means are connected with output terminals of the circuit at which the resultant output components of one input signal (i.e., the carrier signal) are in phase, and the resultant output components of the carrier harmonics and the other input signal (i.e., the modulating signal) are out of phase, respectively, thereby to produce an undistorted output signal in which velocity modulation crosstalk is avoided, and from which the out-of-phase components have been eliminated. Since the modulating signal and the harmonics of the carrier are electrically cancelled without filtering, the modulating signal frequency can be as great as required with no loss of carrier or side band frequencies.

In accordance with another object of the invention, the improved circuit comprises a demodulator for detecting the envelope of an amplitude modulated carrier signal, which may have been velocity modulated with other information, said demodulator serving to electrically cancel the carrier, whereby crosstalk from any velocity modulation is avoided. Since the carrier frequency is electrically cancelled, the envelope frequency can be twice that permitted by current techniques without any appreciable attenuation of the detected signal. Automatic gain control means are provided for feeding back a portion of the direct-current component appearing in the output stage of the demodulator circuit, thereby to cause the gain of the control devices to correspond with the strength of the amplitude modulated carrier signal and to maintain constant for each input control device the percent of conduction time. Summation means are connected with the demodulator at locations at which the carrier signal components are out of phase and the carrier envelope components are in phase, respectively, whereby an undistorted carrier envelope output signal is obtained. In accordance with another feature, ripple feedback means are provided for feeding back the harmonic components appearing in the output stage of the demodulator circuit means and demodulate the device-generated carrier harmonics, whereby a smooth resultant carrier envelope signal is produced containing a minimal degree of carrier, direct-current and harmonic components.

A further object of the invention is to provide a modulator-demodulator circuit in which the channel control devices are of the same polarity in a first embodiment, and opposite polarity in a second embodiment. In the case of the amplitude modulator circuit, when the control devices have the same polarity, the carrier signal component applied to the control devices are of the opposite phase and the modulating signal components are of the same phase, respectively, while in the embodiment in which the control devices are of different polarity, the carrier signal components are of the same phase, while the modulating signal components are of the opposite phase, respectively. Similarly, in the case of the demodulator circuit of the present invention, when the control devices of the circuit have the same polarity, the amplitude modulated carrier signal components applied to the control devices are of the opposite phase while the direct current and ripple feedback components are of the same phase. When the control devices have the opposite polarity, the amplitude modulated carrier signal components applied to the control devices have the same phase while the direct current and ripple feedback components have the opposite phase.

The basic amplitude modulator or demodulator circuit of the present invention offers the advantages that it is insensitive to carrier frequency, requires no heavy bulky inductors or variable capacitors, requires no special tuning and can be easily designed as an integrated circuit. The circuit has utility in such applications as FM multiplexing, LF, VLF and ELF communications, underwater acoustics, and other communication systems up to the frequency limits of the control devices. The circuit is particularly suitable for use in situations in which physical dimensions and/or the power supply drain are critical, or when a wide range of frequencies are required to be handled by a single device with minimum adjustment. The circuit is ideally suited for amplitude modulating a previously velocity-modulated carrier signal and for detecting the envelope of such an amplitude-velocity-modulated signal with no appreciable cross-talk between the AM and the VM.

Other objects and advantages of the invention will become apparent from a study of the following specification when viewed in the light of the accompanying drawing, in which.

Figure 1:
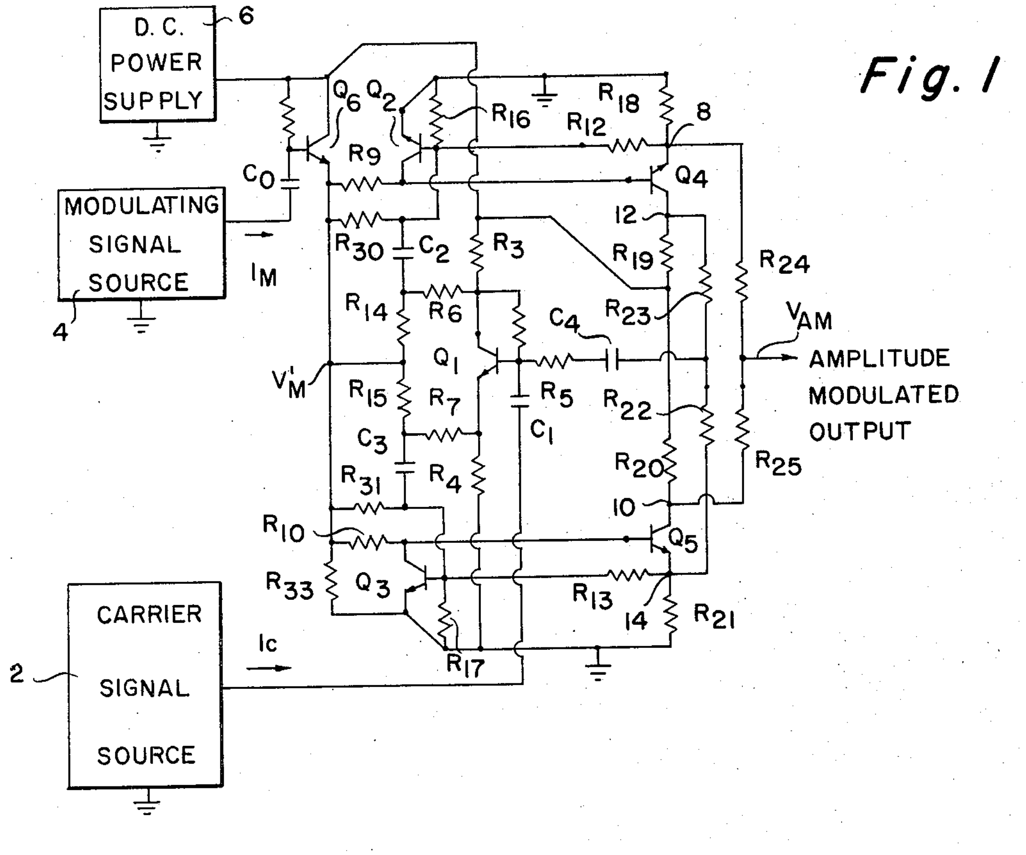
FIG. 1 is an electrical schematic diagram of a amplitude modulator embodiment of the present invention wherein the transistors of the respective stages of the circuit have the same polarity.
Figure 6:
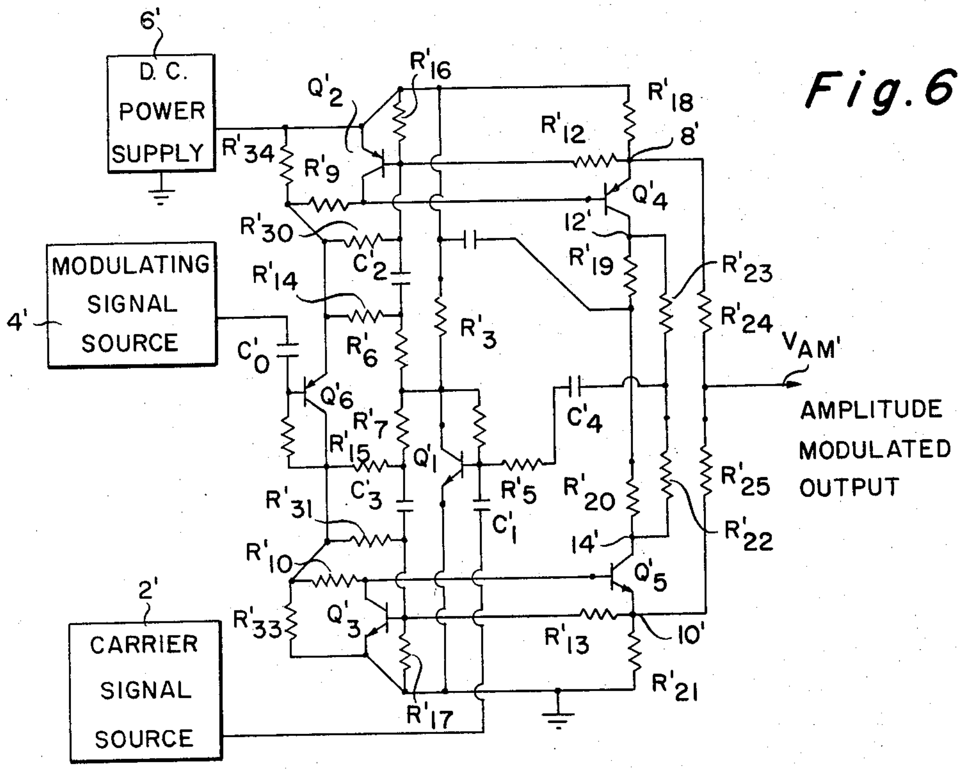
Figure 7:
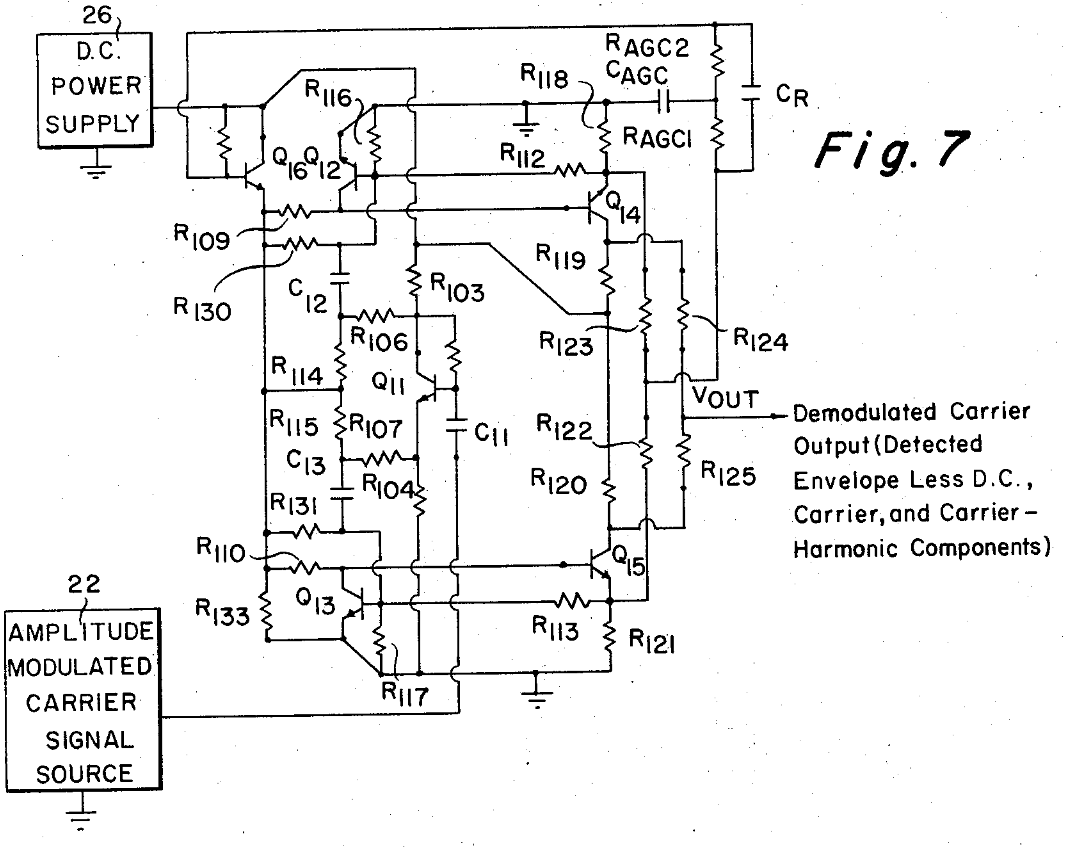
Figure 9:
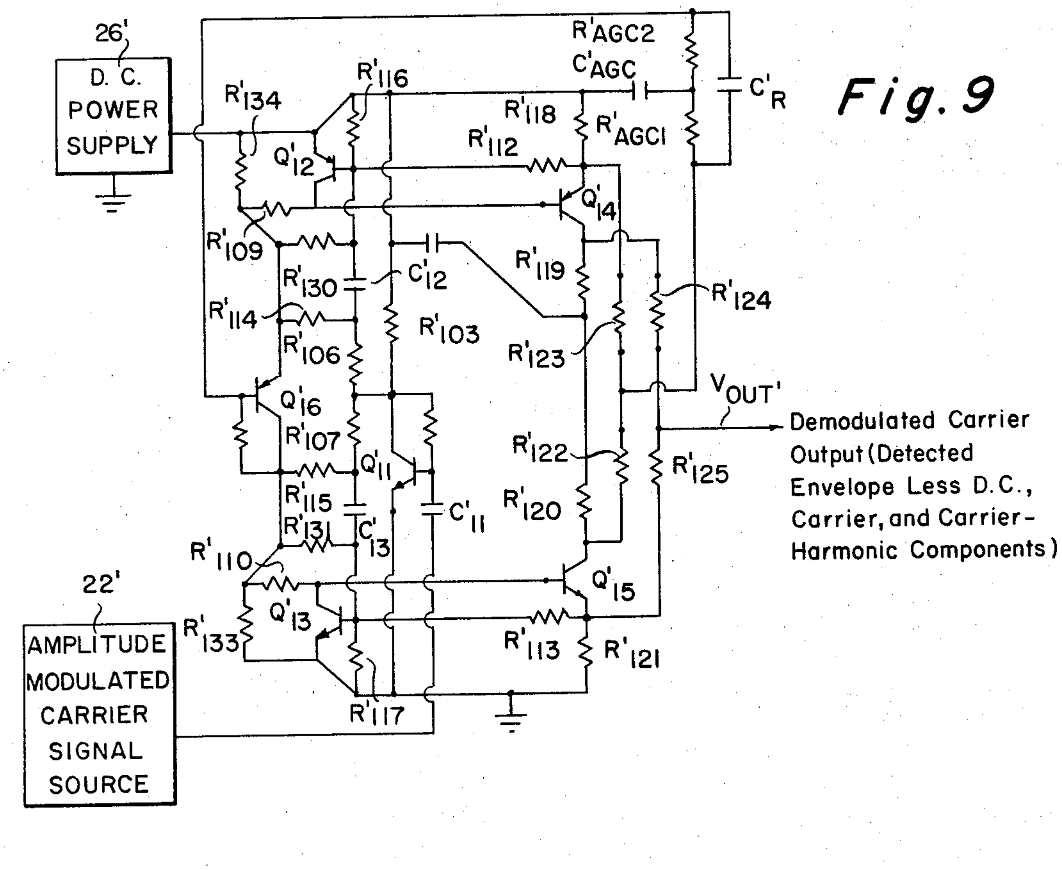
Figure 8:
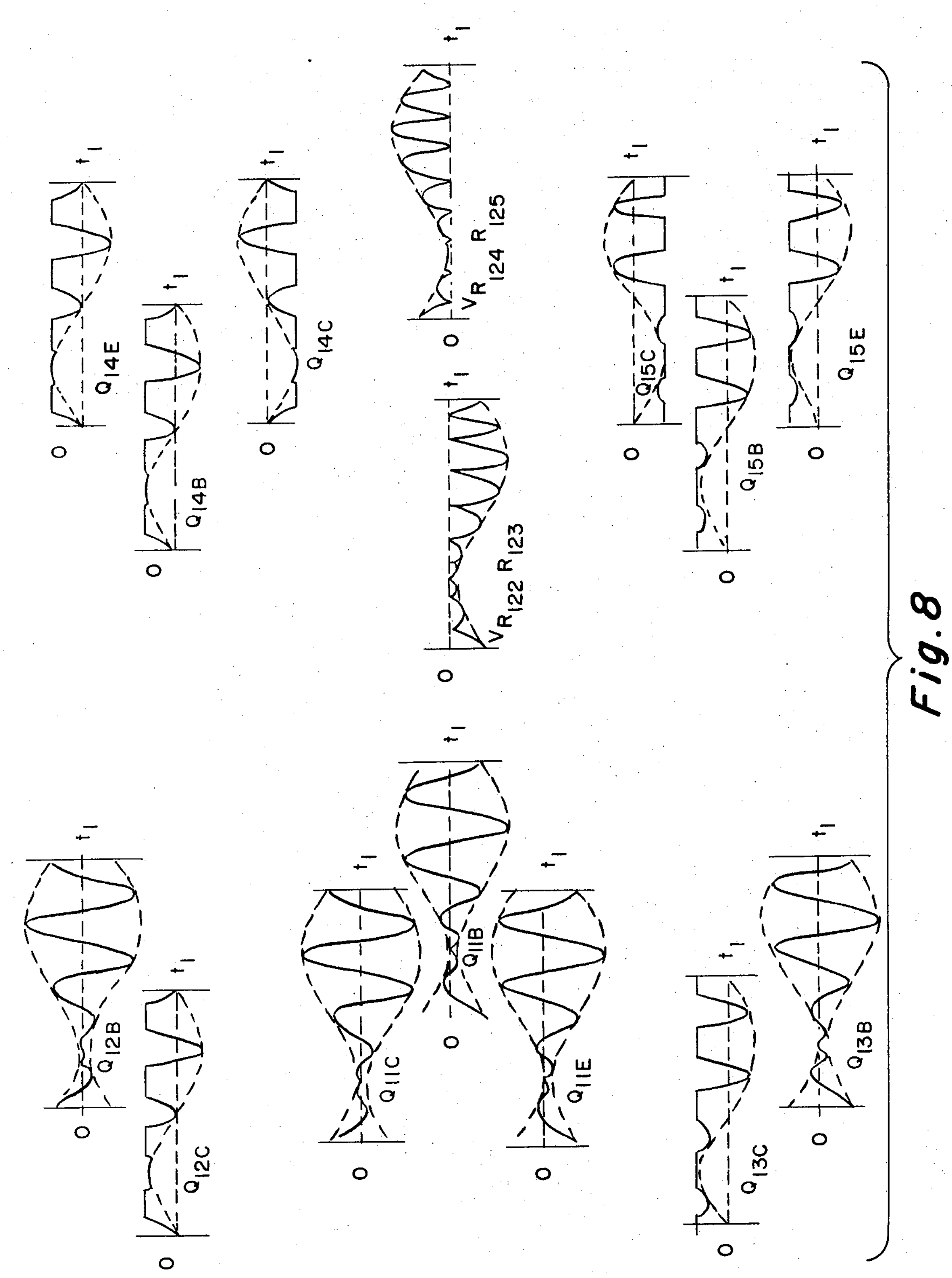

FIGS. 3*a*–3*e* illustrate the waveforms of an amplitude modulator of the prior art wherein the modulating signal is applied to the base electrode of a transistor;

FIGS. 4*a*–4*d* illustrate the waveforms of an amplitude modulator of the prior art wherein the modulating signal is applied to the collector electrode of a transistor;

FIGS. 5*a*–5*f* illustrate the waveforms of the present invention wherein the modulating signal is applied to both the base and the collector electrodes of the transistor;

FIG. 6 is an electrical schematic diagram of a modification of the amplitude modulator of FIG. 1 wherein the channel transistors of the respective stages of the modulator are of the opposite polarity;

FIG. 7 is an electrical schematic diagram of a demodulator embodiment of the present invention including corresponding channel transistors of the same polarity;

FIG. 8 illustrates the signal waveforms at various locations of the circuit of FIG. 7, the waveforms being illustrated as they would appear in the absence of the feedback circuit which causes amplitude modulation of each channel that is out of phase with the device-generated carrier harmonics and direct current signal components; and FIG. 9 is an electrical schematic diagram of an alternate demodulator embodiment of the present invention including corresponding channel transistors of the opposite polarity.

Figure 2:
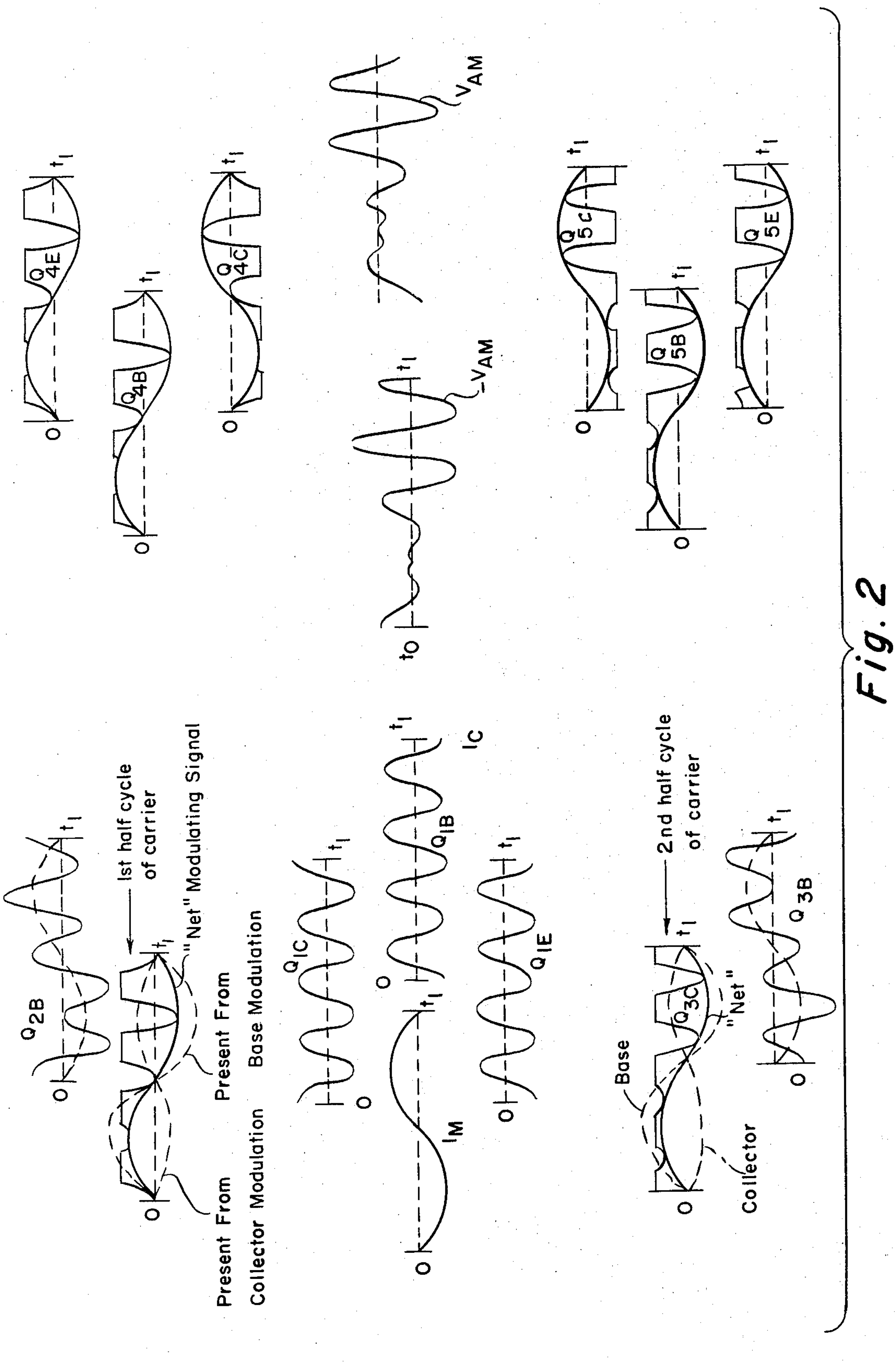
FIG. 2 is a diagrammatic representation of the waveforms of the signals at various locations of the circuit of FIG. 1.

Referring first more particularly to the amplitude modulator circuit of FIG. 1, dual-channel circuit means are provided including pairs of corresponding input and output stage channel transistors $Q_2$, $Q_3$ and $Q_4$, $Q_5$, respectively, that are of the same polarity, said circuit means being designed to modulate a carrier signal $I_C$ provided by the source 2 with a modulating signal $I_M$ from the source 4 to produce a distortion-free amplitude modulated output signal $V_{AM}$. The waveform configurations of these signals are shown in FIG. 2 at spacial locations that correspond generally with the circuit locations of FIG. 1.

Figure 3:
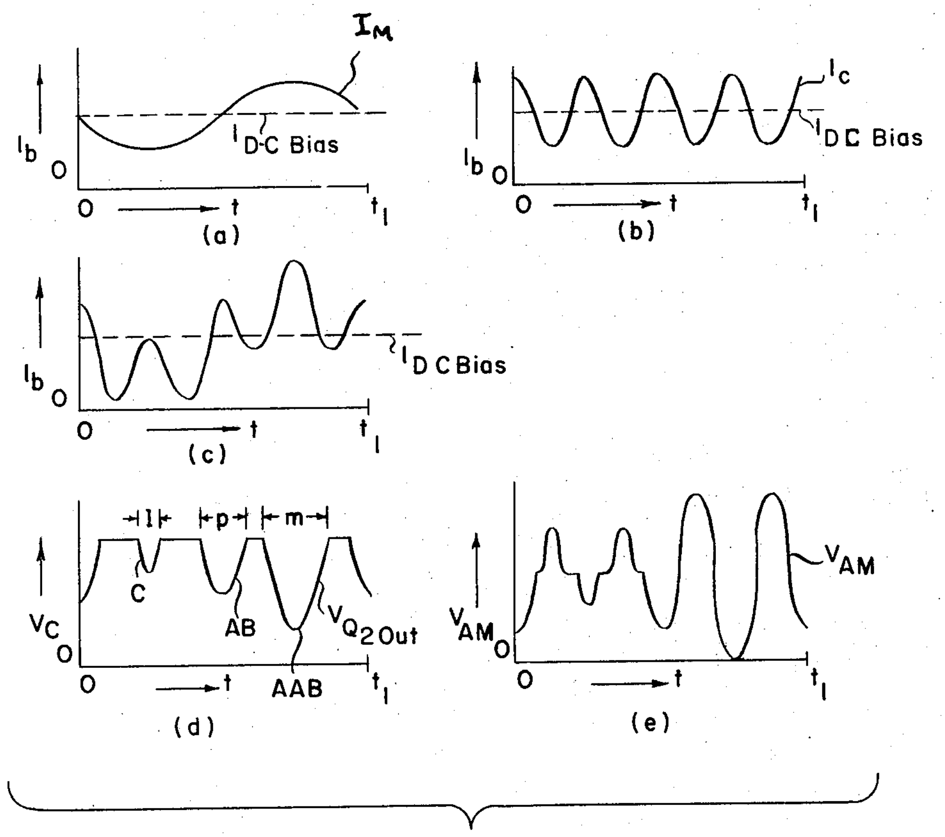

In prior amplitude modulators, it is conventional to apply the carrier signal to only one electrode (e.g., either the base, the emitter or the collector of a transistor) and to apply the modulating signal to a given single electrode of the device. Referring to FIG. 3, when the modulating signal $I_M$ is added to the d-c bias signal on the base electrode of a transistor $Q_2$ (FIG. 3*a*) and the carrier signal $I_C$ is applied to the d-c bias signal on the base electrode (FIG. 3*b*), the resultant waveform of the base current $I_b$ plus the d-c bias signal has the configuration of FIG. 3*c*, thereby producing on the collector electrode of transistor $Q_2$ the output voltage $V_{Q2OUT}$ of FIG. 3d. Consequently, the output $V_{AM}$ of the modulator circuit has the rather distorted amplitude modulated waveform $V_{AM}$ of FIG. 3*e*. As illustrated in FIG. 3d, Class C operation of the transistor $Q_2$ produces a relatively short conduction time "*l*," while Class AB and Class AAB operation produce medium and relatively long conduction times "p" and "m," respectively.

Figure 4:
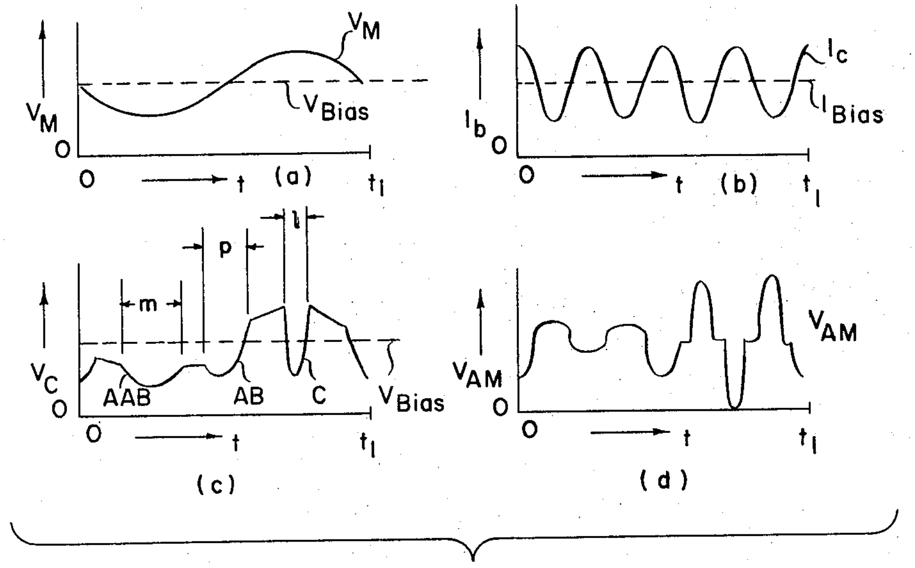

Referring to FIG. 4, it will be seen that when the modulating signal $V_M$ is superimposed on the d-c bias voltage applied to the collector electrode of transistor $Q_2$ (FIG. 4*a*), and when the carrier signal $I_C$ is superimposed on the base biasing signal $I_{BIAS}$ (FIG. 4*b*), the transistor $Q_2$ has the collector electrode output waveform of FIG. 4*c*, and the dual channel modulator has the relatively distorted amplitude modulated output voltage $V_{AM}$ of FIG. 4*d*. As shown in FIG. 4*c*, Class AAB, Class AB and Class C operations of transistor $Q_2$ produce the relatively long, medium, and relatively short conduction times "m," "p" and "*l*," respectively.

Figure 5:
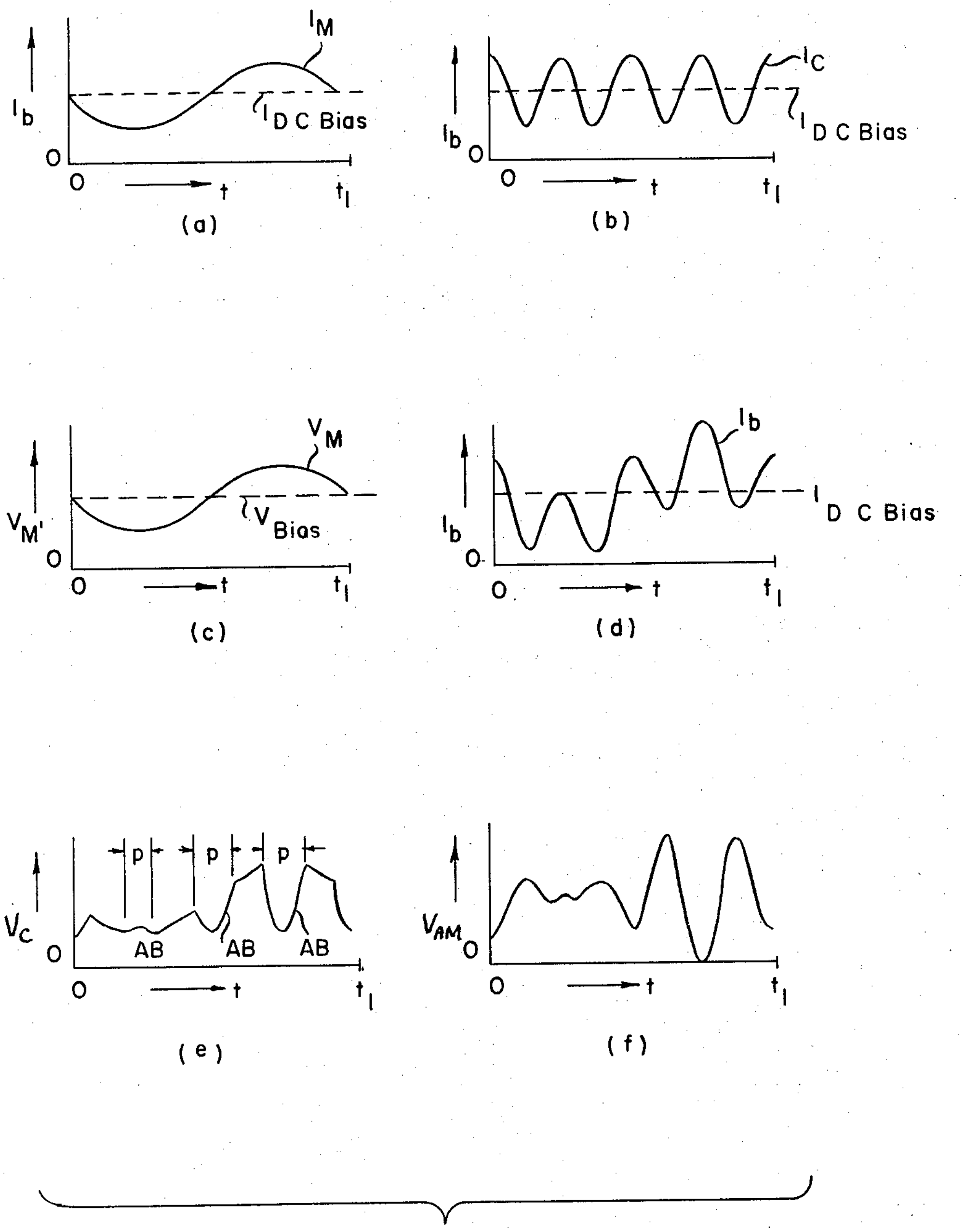

In accordance with the characterizing feature of the present invention, as illustrated in FIG. 5, a distortion-free amplitude modulated output signal is achieved by simultaneously applying the modulating signal to two electrodes of the modulating transistor of each channel of the modulator, said transistors being biased to Class AB operation. Thus, the modulating signal $I_M$ (FIG. 5*a*) and the carrier signal $I_C$ (FIG. 5*b*) are superimposed on the bias signal $I_{D\text{-}C\ BIAS}$ applied to the base electrode, while the modulating signal $V_M'$ is also applied to the bias voltage $V_{BIAS}$ supplied to the collector electrode of transistor $Q_2$ (FIG. 5*c*). The resultant base current of $Ib$ of transistor $Q_2$ has the waveform of FIG. 5*d*, and the collector output voltage $V_{Q2OUT}$ of transistor $Q_2$ has the configuration of FIG. 5*e*. Since the conduction times of the Class AB-biased transistor Q2 are each equal to the value "p," the resultant output voltage waveform $V_{AM}$ of the dual-channel amplitude modulator has a subsequently distortion-free configuration as shown in FIG. 5*f*.

Referring again more particularly to FIG. 1, the modulating transistors $Q_2$ and $Q_3$ of the dual channel modulator are biased to Class AB operation as follows. Preferably the bias on the modulating signal input transistor $Q_6$ is one-half the value of the d-c power supply 66, thus permitting modulating excursion to be above and below the steady state emitter voltage ($V_{E6}$) of transistor $Q_6$. This voltage is applied to each channel directly to resistors $R_9$ and $R_{10}$ to establish the applied steady state collector circuit voltage for transistors $Q_2$ and $Q_3$, respectively, and directly to resistors $R_{30}$ and $R_{31}$ to establish a certain minimum base current to transistors $Q_2$ and $Q_3$, respectively. In each channel, the directly coupled amplifiers ($Q_2$, $Q_4$ and $Q_3$, $Q_5$, respectively) establish through conventional feedback means, in combination with the bias obtained from d-c voltage source 6, the proper base current so that $Q_2$ and $Q_3$ are just barely "on" (i.e., a steady state collector current exists in each transistor). Thus, the steady state collector voltage $V_{C2}$, $V_{C3}$ of $Q_2$ and $Q_3$, respectively, is less than, but nearly equal to, the applied collector circuit voltage. Second stage transistors $Q_4$ and $Q_5$ are biased to be nearly (but not completely) saturated, so that the collector-to-emitter voltage is very small. Since the collector-to-base intra electrode capacitance is a function of collector-to-base voltage and collector and base current, the net effect is that capacitance changes in $Q_2$, $Q_3$ are somewhat cancelled by those in $Q_2$, $Q_4$, respectively. This further assists in preventing device-initiated, undesirable velocity modulation and sensitivity.

In operation, the carrier signal $I_C$ is applied to the base of $Q_1$, via capacitor $C_1$, and owing to the phase splitting operation of $Q_1$, out-of-phase carrier signal components are applied to the base electrodes of transistors $Q_2$ and $Q_3$ via the paths including resistors $R_6$ and capacitor $C_2$, and resistor $R_7$ and capacitor $C_3$, respectively. In accordance with a characterizing feature of the present invention, the magnitude of the applied carrier is such that for slightly more than one-half cycle of the carrier signal, $Q_2$ and $Q_3$ conduct, the exact percent of conduction time (*p*) being established (FIG. 5*e*) to permit ideal summation of the signals from each channel to obtain an output signal free of any "cross over" distortion. The phasing of the carrier signals applied to the base electrodes of $Q_2$ and $Q_3$ is such as to cause transistors to conduct on alternate half cycles of the carrier signal, respectively, and thus obtain full wave amplitude modulation in the summation of the signals from each channel.

Transistors $Q_4$ and $Q_5$ are employed, in conjunction with $R_{18}$, $R_{19}$ and $R_{20}$, $R_{21}$, respectively, as phase splitting circuits with a voltage gain of approximately 1 for their respective channels. By reversing the phase of one of the signals but not changing its amplitude, it is possible to obtain two signals which, when added together, provide a complete carrier signal output that is free of crossover distortion, since carrier harmonics generated in the rectification process are electrically cancelled in the summation process. Thus, the signal at the emitter of $Q_4$ (point 8) is added with the signal at the collector of $Q_5$ (point 10) to effect an amplitude modulated output signal $V_{AM}$ that is in phase with the original carrier input signal, while the signals at the collector of $Q_4$ (point 12) and the emitter of $Q_5$ (point 14) are added to give the output signal $-V_{AM}$ that is out-of-phase with the original carrier input signal. This out-of-phase signal is fed back to the base electrode of $Q_1$, via $C_4$ and $R_5$ to ensure distortionless operation.

The modulating signal $I_M$ is applied via $C_0$ to the base of $Q_6$, and owing to the common collector configuration of $Q_6$, the high input impedance at its base isolates the modulating signal source from the carrier source. The modulating signal $V_M$ is then superimposed on the steady state emitter voltage of $Q_6$. In accordance with the present invention, components of modulating signal $V_M'$ of the same phase are applied to a pair of electrodes of each of the transistors $Q_2$ and $Q_3$, respectively. More particularly, the modulating voltage is applied to the collector electrodes of $Q_2$ and $Q_3$ via $R_9$ and $R_{10}$, respectively, and to the base electrodes via the parallel branches including $R_{30}$, $R_{14}$, $C_2$ and $R_{31}$, $R_{15}$, $C_3$, respectively. As shown in FIG. 5*e*, since the modulating voltage $V_M$ is applied to two electrodes of the Class AB-biased transistors, a constant percent of conduction time "*p*" is obtained regardless of the instantaneous magnitude of the modulating signal.

As compared with the single electrode amplitude modulated output waveforms $V_{AM}$ of FIGS. 3*e* and 4*d*, the output waveform (FIG. 5f) of the dual-electrode modulator embodiment is completely free of cross-over distortion, and therefore there is no need for any type of filter circuit to provide a proper output. In accordance with the present invention, since in each channel the percent of conduction time "*p*" is constant and the intraelectrode capacitance changes of $Q_2$, $Q_3$ are compensated by those of $Q_2$, $Q_4$, respectively, no undesirable velocity modulation (phase or frequency modulation) is inducted in the output signal.

Referring now to the amplitude modulation circuit of FIG. 6, it will be seen that the corresponding transistors of the two channels have unlike polarities, primed reference numerals being used for like components in FIG. 1. In this embodiment, the channel components of the carrier signal obtained at the collector of $Q_1'$ are in phase, while the modulating signal components from source 4' are phase split by input transistor $Q_6'$, whereby the modulating signal components applied to the base and collector electrodes of $Q_2'$ are 180° out of phase from those applied to the collector and base electrodes of $Q_3'$. Owing to the polarity relationships at the output, the output voltage $V_{AM}'$ is obtained by the output resistor branch $R_{24}$, $R_{25}$, which branch is connected with the emitter electrodes 8', 10' of the second-stage transistors $Q_4'$ and $Q_5'$, respectively. Negative feedback to the carrier signal input transistor $Q_1'$ is obtained from the resistor branch $R_{22}'$, $R_{23}'$ connected across the collector terminals 12', 14' of transistors $Q_4'$ and $Q_5'$, and via capacitor $C_4'$ and $R_5'$.

Referring now to FIGS. 7 and 8, a demodulator embodiment of the present invention is disclosed for demodulating an amplitude modulated carrier signal to detect the envelope thereof. Corresponding transistors $Q_{12}$, $Q_{13}$ and $Q_{14}$ and $Q_{15}$, respectively, of each channel have the same polarity in FIG. 7, respectively, the amplitude modulated carrier signal from source 22 being applied to the base electrode of supply transistor $Q_{11}$ via $C_{11}$, whereupon owing to the phase splitting operation of $Q_1$, amplitude modulated carrier signal components of opposite polarity are applied to the base electrodes of transistors $Q_{12}$ and $Q_{13}$ via $R_{106}$, $C_{12}$ and $R_{107}$, $C_{13}$, respectively.

As in the embodiment of FIG. 1, the transistors $Q_{12}$ and $Q_{13}$ are biased by transistors $Q_{14}$ and $Q_{15}$, respectively, in conjunction with $Q_{16}$ to Class AB operation, thereby to obtain in each channel, for alternate half cycles of the carrier signal, demodulated signals ($Q_{12C}$, $Q_{13C}$ [FIG. 8]) that include a direct-current component, a carrier signal component, a carrier envelope component, and a plurality of carrier signal harmonic components. Summation means including the resistor branch $R_{124}$, $R_{125}$ are connected with the output terminals of transistors $Q_{14}$ and $Q_{15}$ at locations at which the detected carrier envelope, carrier-harmonic and direct-current components are in-phase, and the carrier components are out-of-phase, whereby the output voltage $V_{OUT}$ equals the detected carrier envelope.

The summation branch $R_{122}$, $R_{123}$ are connected with output terminals of transistors $Q_{14}$, and $Q_{15}$ at locations at which the direct-current components and the carrier harmonic and carrier envelope components are in phase. In accordance with a characterizing feature of the invention, a portion of the d-c component is fed back to the base of transistor $Q_{16}$ via automatic gain control resistors $R_{AGC1}$ *and* $R_{AGC2}$ so that for a strong carrier signal input, the gains of $Q_{12}$ and $Q_{13}$ are reduced. Components of the d-c feedback signal are supplied to the collector electrodes of $Q_{12}$ and $Q_{13}$ via resistors $R_{109}$ and $R_{110}$, respectively, and to the base electrodes of $Q_{12}$ and $Q_{13}$ via $R_{130}$ and $R_{131}$, respectively. Consequently, as in the embodiment of FIG. 1, a constant percent of conduction time "p" is obtained for transistors $Q_{12}$ and $Q_{13}$ regardless of carrier signal strength. This will also have the result of reducing the direct-current components in the channel demodulated signals, respectively.

Although the fundamental carrier signal is cancelled out in the summation process, the harmonics of the carrier signal that result from the rectification process are fed back to the base of $Q_{16}$ via capacitor $C_R$, components of the same phase of said harmonic signal being applied to the collector electrodes of transistors $Q_{12}$ and $Q_{13}$ via resistors $R_{109}$ and $R_{110}$, respectively, and to the base electrodes via networks $R_{130}$, $R_{114}$, $C_{12}$ and $R_{131}$, $R_{115}$, $C_{13}$, respectively. The phase relation of the harmonics with respect to the carrier at each base and collector is such as to minimize the ability of $Q_{12}$ and $Q_{13}$ to amplify the rectified carrier and its resultant harmonics while not affecting the ability of $Q_{12}$ and $Q_{13}$ to amplify the detected envelope of the carrier. Even if the frequency of the detected envelope is one-half the carrier frequency, the reactance $X_{CR}$ of capacitor $C_R$, at any of the harmonic frequencies, is less than one-fourth $X_{CR}$ at the detected envelope frequency. Since $X_{CR}$ is "loaded" primarily by $R_{AGC2}$ (since the reactance $X_{AGC}$ is near zero at carrier harmonic frequencies and detected envelope frequencies, but much greater than zero at average-signal-strength-variation frequencies), the envelope will not pass through $C_R$, whereas the harmonics will if $R_{AGC2} = X_{CR}$ at the carrier frequency.

The resultant output signal $V_{OUT}$ is the detected envelope of the AM carrier signal which is absolutely free of the carrier signal, and subsequently absolutely free of the d-c component in standard detection techniques, and carrier harmonic components (i.e., ripple).

In the alternate embodiment of FIG. 9, the complementary first and second stage transistors $Q_{12}'$, $Q_{13}'$ and $Q_{14}'$, $Q_{15}'$ are of the opposite polarity, and consequently components of the same phase of the amplitude modulated carrier signal source are applied to the base electrodes of $Q_{12}'$ and $Q_{13}'$ from the collector of $Q_{11}'$ via resistor $R_{106}'$ and capacitor $C_{12}'$, and via resistor $R_{107}'$ and capacitor $C_{13}'$, respectively. Components of the d-c and ripple feedback signals are subjected to the phase splitting action of $Q_{16}'$, whereby the component signals applied to the collector and base electrodes of $Q_{12}'$ are out of phase to those applied to the collector and base electrodes of $Q_{13}'$. The output summation circuit $R_{124}'$, $R_{125}'$ is connected at one end to the collector electrode of $Q_{14}'$ and at the other end to the emitter electrode of $Q_{15}'$, while the summation circuit $R_{122}'$, $R_{123}'$ is connected at one end to the emitter electrode of $Q_{14}'$ and at the other end to the collector electrode of $Q_{15}'$.

It is apparent that in FIG. 1, $Q_4$ and $Q_5$ could be of the opposite polarity from that of $Q_2$ and $Q_3$, respectively, or $Q_4$ could be of opposite polarity from that of $Q_5$. Various other modifications may be made in the apparatus described without deviating from the inventive concepts set forth above.

What is claimed is:

1. An inductorless modulator-demodulator circuit for use in combining a pair of input signals, comprising full-wave circuit means including a pair of symmetrical channels each containing a control device ($Q_2$, $Q_3$; $Q_{12}$, $Q_{13}$) having at least three electrodes;

means ($Q_4$, $Q_5$, $Q_6$; $Q_{14}$, $Q_{15}$, $Q_{16}$) biasing said control devices to Class AB operation;

first means ($Q_1$, $Q_{11}$) for applying to corresponding single electrodes of each of said control devices components of a first input signal, the amplitude of said first signal being such as to produce for each control device a constant specific percent of conduction time (p) per cycle of said first signal;

second means ($Q_6$, $Q_{16}$) for applying simultaneously to corresponding pairs of electrodes of each of said control devices components of a second input signal, said first and second signal applying means being such that the components of one of said input signals are of like phase and the components of the other signal are of opposite phase, respectively; and summation means ($R_{24}$, $R_{25}$; $R_{124}$, $R_{125}$) for adding the output signals from said control devices at locations at which the resultant output components of one input signal are in phase and the resultant output components of the other input signal are out-of-phase, respectively, thereby to produce an output signal from which said out-of-phase components have been eliminated.

2. Apparatus as defined in claim 1, wherein said circuit means comprise a full-wave modulator circuit, wherein said first input signal comprises a carrier signal, and wherein said second input signal comprises a modulating signal, whereby said output signal comprises an undistorted amplitude modulated carrier signal containing an unsuppressed carrier.

3. Apparatus as defined in claim 2, and further including second summation means ($R_{22}$, $R_{23}$) for adding the output signals from said control devices at locations at which the resultant output components of said one input signal are out of phase and the resultant output components of the other input signal are in phase, respectively, thereby to produce a negative feedback signal, and feedback means ($C_4$, $R_5$) for feeding said feedback signal to said first carrier signal applying means, thereby to elimate residual distortion.

4. Apparatus as defined in claim 1, wherein said circuit means comprises a full-wave demodulator circuit, wherein said first input signal comprises an amplitude modulated carrier signal, thereby producing at first output terminals of said full-wave circuit carrier envelope, direct-current and carrier harmonic components that are in-phase, and carrier components that are out-of-phase, respectively, whereby an output signal ($V_{OUT}$) from said demodulator circuit is produced that is the carrier envelope of said amplitude modulated input signal, said circuit including second output terminals at which the carrier signal components are also out-of-phase and the direct-current and carrier harmonic components are also in-phase, respectively; and gain-control means ($R_{AGC1}$, $R_{AGC2}$) connected with said second output terminals for feeding back to said second signal applying means a direct-current gain control signal, thereby to cause the gain of the input control devices to correspond with the strength of the amplitude modulated carrier signal and to maintain constant for each control device the percent of conduction time (p).

5. Apparatus as defined in claim 4, and further including carrier harmonic feedback means ($C_R$) for feeding back to said second signal applying means from said second output terminal means the harmonic components appearing in the output stage of said demodulator circuit means, whereby a smooth resultant carrier envelope signal is produced containing a minimal degree of carrier, direct-current and harmonic components.

6. Apparatus as defined in claim 1, wherein said control devices have the same polarity, and further wherein said first signal applying means comprise phase-splitter means for supplying to corresponding electrodes of said control devices components of said first input signal that are out-of-phase, respectively.

7. Apparatus as defined in claim 6, wherein said second signal applying means applied to corresponding pair of electrodes of said control devices components of said second input signal that are in-phase, respectively.

8. Apparatus as defined in claim 1, wherein said control devices have the opposite polarity, and further wherein said second signal applying means comprise phase-splitter means for supplying simultaneously to corresponding pairs of electrodes of said control devices components of said second input signal that are out-of-phase, respectively.

9. Apparatus as defined in claim 8, wherein said first signal applying means is operable to supply to corresponding electrodes of said control devices components of said first input signal that are in-phase, respectively.

10. Inductorless apparatus for amplitude modulating a carrier signal with a modulating signal, comprising a. full-wave modulator circuit means defining a pair of channels for amplitude modulating alternate half cycles of the carrier, respectively, each of said channels including an electronic control device ($Q_2$, $Q_3$) including at least three electrodes;

b. means ($Q_4$, $Q_5$, $Q_6$) biasing said control devices, in the absence of a modulating signal, to Class AB operation;

c. first means ($Q_1$) for applying components of said carrier signal to corresponding electrodes of said control devices, respectively, said carrier signal being of an amplitude to produce for each control device a specific percent of conduction time (p) per cycle of carrier signal;

d. second means ($Q_6$) for applying components of said modulating signal simultaneously to corresponding pairs of electrodes of each of said control devices, respectively, thereby to produce for each of said control devices a resultant amplitude modulated output signal of a magnitude and waveform configuration to maintain constant said specific percent of conduction time for each of said control devices regardless of the instantaneous magnitude of said modulating signal, thereby minimizing crossover distortion and self induced velocity modulation, one of said first and second signal applying means comprising phase-splitter means for causing the signal components produced thereby to be out-of-phase;

e. said pair of channels including a pair of output terminals at which said carrier signals are in phase, said modulating signals and harmonics of said carrier signal are out of phase, and direct-current components are in opposition, respectively; and f. summation means ($R_{24}$, $R_{25}$) for algebraically adding the channel output signals appearing at said output terminals to cancel said modulating signals, said carrier signal harmonics, and said direct-current components, thereby to obtain an undistorted amplitude modulated output signal.

11. Apparatus as defined in claim 10, and further including negative feedback means ($C_4$, $R_5$) for feeding back to said first signal applying means a control signal that is 180° out of phase with said output signal.

12. Apparatus as defined in claim 11, and further including means (bias of $Q_4$, $Q_5$) for compensating for intraelectrode capacitance changes of $Q_2$, $Q_3$, respectively, thereby further minimizing self-induced velocity modulation and cross-talk.

13. Inductorless apparatus for demodulating an amplitude modulated carrier signal to detect the envelope thereof, comprising a. circuit means defining a pair of channels for demodulating alternate half cycles of the carrier signal, respectively, each of said channels including an electronic control device ($Q_{12}$, $Q_{13}$) including at least three electrodes;

b. first means ($Q_{11}$) for applying said amplitude modulated carrier signal to corresponding electrodes of said control devices, respectively;

c. biasing means ($Q_{14}$, $Q_{15}$, $Q_{16}$) biasing said control devices to Class AB operation relative to the unmodulated component of said amplitude modulated carrier signal, thereby to obtain in said channels, for alternate half cycles of the carrier signal, respectively, demodulated signals ($Q_{12C}$, $Q_{13C}$) each including a direct-current component, a carrier signal component, a carrier envelope component, and a plurality of carrier signal harmonic components;

d. summation means ($R_{124}$, $R_{125}$; $R_{122}$, $R_{123}$) for algebraically adding said demodulated signals to cancel said carrier signal components and to add said direct-current, carrier envelope and harmonic components; and e. second means ($Q_{16}$) for feeding back in out-of-phase relation to corresponding pairs of electrodes of each of said control devices, respectively, the resultant direct-current component from said summation means, thereby 1. to cause the gain of each control device to vary inversely with respect to the strength of the amplitude modulated signal,
2. to maintain substantially constant for each of said control devices the specific percent of conduction time (p) per cycle of carrier signal, thereby to minimize self-induced velocity modulation sensitivity, and
3. to reduce said direct-current components in said channel demodulated signals, respectively.

14. Apparatus as defined in claim 13, and further including harmonic feed-back means ($C_R$) connected with said second signal applying means for feeding back to said control devices in out-of-phase relation the harmonic components of said carrier signal, thereby to reduce the harmonic components contained in said channel demodulated signals, respectively.

15. Apparatus as defined in claim 14, and further including means for compensating for changes in intra-electrode capacitance, thereby to minimize velocity modulation sensitivity and crosstalk.

* * * * *

UNITED STATES PATENT OFFICE
CERTIFICATE OF CORRECTION

Patent No. 3,810,047 Dated May 7, 1974

Inventor(s) Donald H. Gehring

It is certified that error appears in the above-identified patent and that said Letters Patent are hereby corrected as shown below:

In the Heading, correct the inventor's address to read "441 N. Armistead"

Column 3, line 37, change "a" to: -- an --

Column 5, line 9, change "66" to: -- 6 --

Column 6, line 34, change "$Q_2$, $Q_4$" to: $Q_4$, $Q_5$ -- line 50, change "$R_{24}$, $R_{25}$" to: -- $R_{24}'$, $R_{25}'$ --

Column 7, correct line 25 to read:
-- Control resistors $R_{AGC1}$ and $R_{AGC2}$ --

Claim 7, line 3, change "pair" to: -- pairs --

Signed and sealed this 7th day of January 1975.

(SEAL)
Attest:

McCOY M. GIBSON JR.
Attesting Officer

C. MARSHALL DANN
Commissioner of Patents